(12) United States Patent
Li et al.

(10) Patent No.: US 10,723,639 B2
(45) Date of Patent: Jul. 28, 2020

(54) SELF-CIRCULATING FLOCCULATION WASHING MACHINE AND CONTROL METHOD

(71) Applicant: QINGDAO HAIER WASHING MACHINE CO., LTD., Qingdao, Shandong (CN)

(72) Inventors: Dong Li, Shandong (CN); Min Che, Shandong (CN); Jiangtao Zhang, Shandong (CN); Chunfeng Lao, Shandong (CN)

(73) Assignee: QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 448 days.

(21) Appl. No.: 15/569,987

(22) PCT Filed: Apr. 15, 2016

(86) PCT No.: PCT/CN2016/079403
§ 371 (c)(1),
(2) Date: Oct. 27, 2017

(87) PCT Pub. No.: WO2016/173409
PCT Pub. Date: Nov. 3, 2016

(65) Prior Publication Data
US 2018/0155223 A1   Jun. 7, 2018

(30) Foreign Application Priority Data

Apr. 29, 2015   (CN) .......................... 2015 1 0212798

(51) Int. Cl.
*C02F 1/52*       (2006.01)
*D06F 39/08*    (2006.01)
(Continued)

(52) U.S. Cl.
CPC .............. *C02F 1/52* (2013.01); *D06F 39/006* (2013.01); *D06F 39/08* (2013.01); *D06F 39/085* (2013.01);
(Continued)

(58) Field of Classification Search
None
See application file for complete search history.

(56) References Cited

U.S. PATENT DOCUMENTS

2016/0201249 A1   7/2016   Xu et al.

FOREIGN PATENT DOCUMENTS

| CN | 101906709 A | 12/2010 |
|---|---|---|
| CN | 104372574 A | 2/2015 |

(Continued)

OTHER PUBLICATIONS

International Search Report (PCT/ISA/210) dated Jul. 20, 2016, by the Chinese Patent Office as the International Searching Authority for International Application No. PCT/CN2016/079403.
(Continued)

*Primary Examiner* — Rita P Adhlakha
(74) *Attorney, Agent, or Firm* — Buchanan Ingersoll & Rooney PC

(57) ABSTRACT

A self-circulating flocculation washing machine comprises an outer barrel, a clothes washing structure arranged in the outer barrel and a flocculation water treatment device arranged outside the outer barrel, and the flocculation water treatment device comprises a flocculation container for performing flocculation treatment on water drained from the outer barrel; the washing machine is also provided with a circulating pipe for driving washing water in the outer barrel to perform self-circulation from bottom to top; one end of the circulating pipe communicates with a self-circulating water outlet in the lower part of the outer barrel, the other
(Continued)

end of the circulating pipe communicates with a water outlet of the flocculation container and a self-circulating water inlet of the outer barrel through a tee joint, and a non-return structure for preventing the flocculation water from reflowing is arranged between the tee joint and the water outlet of the flocculation container.

11 Claims, 6 Drawing Sheets

(51) Int. Cl.
*D06F 39/00* (2020.01)
*D06F 39/10* (2006.01)

(52) U.S. Cl.
CPC ............ *D06F 39/088* (2013.01); *D06F 39/10* (2013.01); *C02F 2307/12* (2013.01); *D06F 39/083* (2013.01)

(56) References Cited

FOREIGN PATENT DOCUMENTS

| | | |
|---|---|---|
| CN | 104420123 A | 3/2015 |
| CN | 104514122 A | 4/2015 |
| GB | 2 416 779 A | 2/2006 |
| JP | 2001-054700 A | 2/2001 |
| JP | 2002-119794 A | 4/2002 |
| JP | 2002-292193 A | 10/2002 |
| WO | WO 2008/101276 A1 | 8/2008 |
| WO | 2015/021722 A1 | 2/2015 |

OTHER PUBLICATIONS

Written Opinion (PCT/ISA/237) dated Jul. 20, 2016, by the Chinese Patent Office as the International Searching Authority for International Application No. PCT/CN2016/079403.
Extended European Search Report dated Mar. 28, 2018, issued by the European Patent Office in corresponding European Application No. 16785840.6. (7 pages).

SELF-CIRCULATING FLOCCULATION WASHING MACHINE AND CONTROL METHOD

TECHNICAL FIELD

The present disclosure relates to a self-cleaning washing machine, belonging to the field of washing equipment, particularly to a washing machine capable of performing flocculate self-cleaning treatment on self-circulating washing water, and further relates to a control method for the washing machine.

BACKGROUND

With the improvement of people's living standards, washing machines have become one of major household appliances in people's daily life. The washing process of a washing machine mainly comprises several stages of washing, rinsing and dewatering. In the washing stage, water and a detergent are fed into the washing machine, and clothes are washed; and after the rinsing stage begins, in order to rinse out dirt and the residual detergent, much water is needed or many times of rinsing needs to be performed to rinse the clothes, so that a large amount of water is consumed. Even if a water-saving drum washing machine is used, the clothes also need to be rinsed at least twice to get cleaned, and at least 30 L or above of running water needs to be consumed in the process. Sometimes, dirt on the clothes is less or the use amount of the detergent is less, the clothes can be cleaned after being rinsed twice. But because a user selects three times of rinsing, waste of water can also be caused. For example, a 6 Kg full-automatic washing machine generally consumes about 100 litres of water for rinsing twice. How to thoroughly wash clothes and save water and electricity at the same time is one of the focuses of consumers.

Therefore, the applicant has filed a Chinese patent application with the application number of 201310356428.5, which relates to a washing machine with a circulating water treatment function and a control method for the washing machine. The washing machine comprises an outer barrel, a clothes washing structure arranged in the outer barrel and a flocculation water treatment device arranged under the outer barrel, wherein the flocculation water treatment device comprises a flocculation treatment unit and a filtering unit. The flocculation treatment unit comprises a flocculation container communicating with the outer barrel, and a flocculant deliverer for delivering a flocculant into the flocculation container, and water is discharged from the outer barrel to the flocculation container for flocculation treatment. The filtering unit comprises a filtering container and a filtering screen arranged in the filtering container, the filtering container communicates with the flocculation container and the outer barrel, and water after flocculation treatment in the flocculation container is filtered and re-discharged into the outer barrel for reuse. In this patent application, the flocculation filtration-treated water is circulated until washing is finished, and the water is discharged into the circulating water treatment device for cleaning of the flocculation treatment unit and the filtering unit, and then is drained. The flocculation washing machine provided by this patent application has the characteristics that water is saved, water pollution is reduced, and the environment is protected.

When flocculation treatment is performed on the washing water or rinsing water by a conventional flocculation container, dirt in the water will react with the flocculant, and flocculates are generated. The generated flocculates can precipitate or float, so that water and dirt are separated, and the purpose of purifying the washing water and/or the rinsing water is achieved.

Besides, in the washing process, the washing machine enables the washing water to perform circulation flowing up and down, so that contact between the detergent and clothes can be more sufficient due to the circulating water flows, and the washing efficiency is improved. Therefore, how to integrate two washing manners of flocculate self cleaning and self-circulating flowing of the washing water into the same washing machine becomes a research and development hotspot.

In view of this, the present disclosure is disclosed.

SUMMARY

An object of the present disclosure is to overcome the defects existing in the prior art and provide a self-circulating flocculation washing machine so as to achieve the purpose of self-circulating flowing washing and flocculating self cleaning of washing water. Another object of the present disclosure is to provide a non-return structure so as to realize the purpose of automatic separation and reflow prevention between circulating water flows and a flocculation container.

In order to achieve the purposes, the present disclosure adopts the following technical scheme:

a self-circulating flocculation washing machine, comprising an outer barrel, a clothes washing structure arranged in the outer barrel and a flocculation water treatment device arranged outside the outer barrel, wherein the flocculation water treatment device comprises a flocculation container for performing flocculation treatment on water drained from the outer barrel. The washing machine is also provided with a circulating pipe for driving washing water in the outer barrel to perform self-circulation from bottom to top. And one end of the circulating pipe communicates with a water return opening of the flocculation container and a self-circulating water inlet in the upper part of the outer barrel through a tee joint, and a non-return structure for preventing flocculation water from reflowing is arranged between the tee joint and the water return opening of the flocculation container.

Further, the flocculation water treatment device further comprises a filtering device for filtering water after flocculation treatment so as to separate flocculates; and a water outlet of the filtering device is connected to the tee joint, and the non-return structure is arranged at the water outlet of the filtering device.

Further, the non-return structure is a non-return washer, the non-return washer comprises a ring-shaped mounting part which is mounted on a pipe wall of the water outlet of the filtering device in a sleeving manner and a disc-shaped check part covering the water outlet of the filtering device. The mounting part and the check part are connected through a connecting column, and the connecting column is made from a flexible material which undergoes elastic deformation, so that the check part moves towards the tee joint under the action of the pressure of water flows in the filtering device, and the purpose of single-direction flowing of the water flows between the filtering device and the tee joint is realized.

Further, the non-return structure is a control valve for controlling the opening and closing of the water outlet or a one-way valve for controlling the water flow direction of the water outlet as from the filtering device to the tee joint.

Further, one end of the circulating pipe is connected with a self-circulating water outlet in the bottom of the outer barrel, the other end of the circulating pipe communicates with the self-circulating water inlet in the upper part of the outer barrel and the water outlet of the filtering device through the tee joint. And the circulating pipe is provided with a circulating pump for providing power for self-circulating water flows, so that the water flows in the circulating pipe flow from the self-circulating water outlet of the outer barrel to the tee joint.

Further, a water outlet is formed in the bottom of the outer barrel, and the water outlet communicates with a water inlet of the flocculation container through a conduit provided with a first water pump, so that water in the outer barrel can flow into the flocculation container through the first water pump. The water return opening and a drain opening are formed in the bottom of the flocculation container, and the water return opening communicates with the water inlet of the filtering device through a conduit provided with a second water pump. So that water after flocculation treatment in the flocculation container flows into the filtering device through the second water pump; and the drain opening extends to a drain opening outside the washing machine through a conduit provided with a drain valve, so that the washing water which does not reach the standard after washing or flocculation is drained out.

Another object of the present disclosure is to provide a control method with the washing machine according to any above mentioned, and the control method is characterized in that in a washing process of the washing machine, washing water flows between the outer barrel and the circulating pipe in a circulating manner under the action of the non-return structure. And after washing is completed, flocculation treatment is performed on the washing water, and flocculation water which reaches the standard after flocculation treatment reflows into the outer barrel and/or the circulating pipe to be used for rinsing by the washing machine.

Further, in the washing process, the self-circulating water outlet and the self-circulating water inlet of the outer barrel communicate with each other through the circulating pipe, and the flocculation container is disconnected from the circulating pipe under the action of the non-return structure. In a process that flocculation treatment stops, the self-circulating water outlet and the self-circulating water inlet of the outer barrel communicate with each other through the circulating pipe, and the flocculation container communicates with the circulating pipe under the action of the non-return structure, so that the flocculation water which reaches the standard after flocculation treatment reflows into the outer barrel.

Further, the flocculation water after flocculation treatment is filtered, so that residual flocculates in the flocculation water are filtered out, and clean water obtained through filtering reflows into the outer barrel and/or the circulating pipe.

Further, water flows can only flow in a single direction from the water outlet of the filtering device to the outer barrel and the circulating pipe under the action of the non-return structure.

The present disclosure has the following beneficial effects by adopting the above technical scheme:

1. Through the above arrangement and method, the washing machine is enable to have both a flocculating self-cleaning treatment function and a circulating water washing function; and besides, a flocculation water reflowing device is integrated into the circulating pipe through the tee joint device, so that the structure of the washing machine can be more compact, and the integration degree of the washing machine is increased.

2. Through the arrangement of the non-return structure on a reflow conduit between the flocculation container and the water containing barrel, self-circulating water flows cannot reflow into the flocculation container, and the flocculation water treatment function and the circulating water washing function don't interfere with each other.

3. The non-return washer allowing flexible opening and closing is arranged at the water outlet, and the water outlet is opened or closed by the check part of the non-return washer under the action of the pressure of the water flows, so that the purpose that water flows at the water outlet can only flow in one direction towards the tee joint is achieved.

4. The non-return structure of the present disclosure is also applicable to a flocculation self-cleaning washing machine without a filtering device, so that the circulating water washing function can also be integrated into the washing machine, the applicability of the method and the device disclosed by the present disclosure is improved, and the purpose of improving product diversity is achieved.

5. The self-circulating flocculation washing machine disclosed by the present disclosure is simple in structure and has significant effect, thereby being suitable for popularization.

The specific embodiments of the present disclosure are described in details below with reference to the accompanying drawings.

Figure 1:
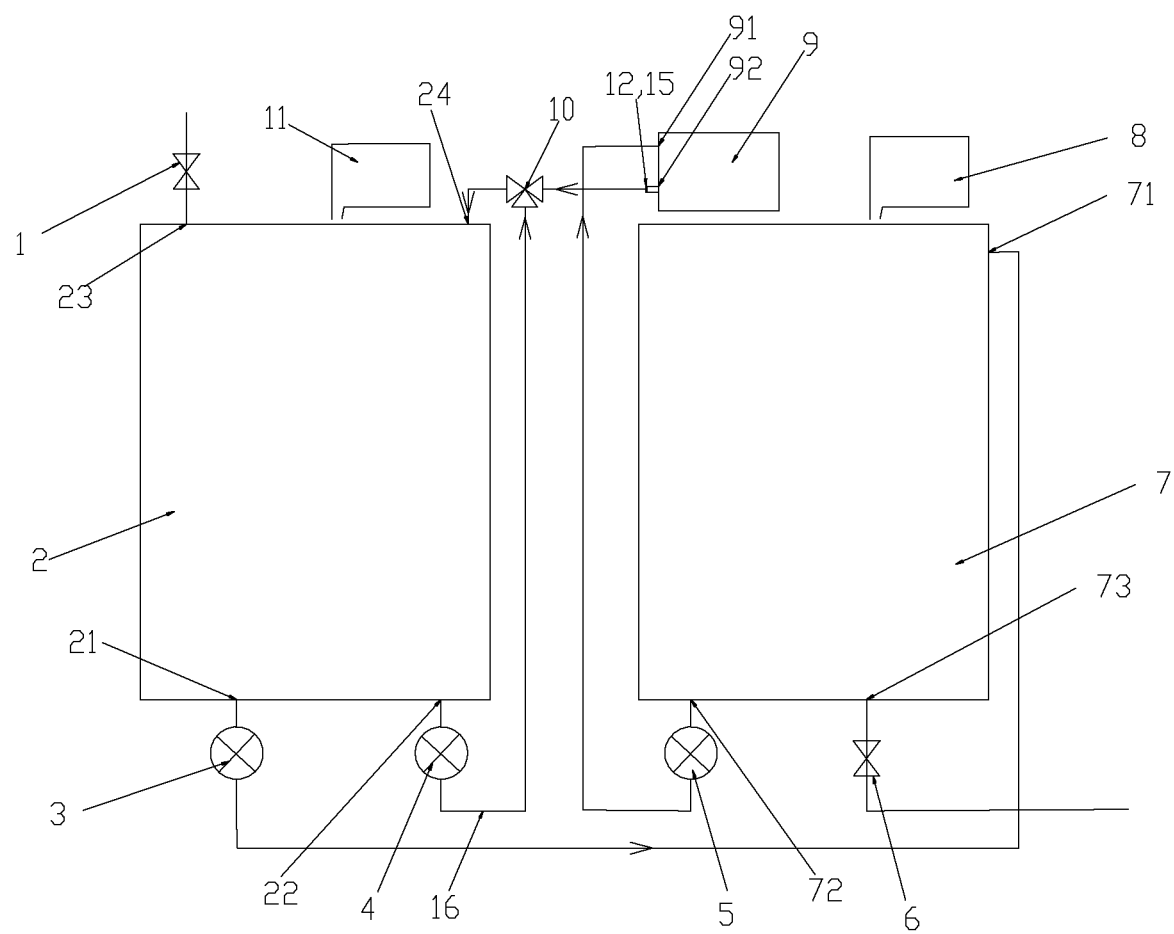
FIG. 1 is a schematic diagram of a washing machine in one embodiment of the present disclosure.

REFERENCE SIGNS 1. water inlet valve; 2. outer barrel; 3. first water pump; 4. circulating pump; 5. second water pump; 6. drain valve; 7. flocculation container; 8. flocculant deliverer; 9. filtering device; 10. tee joint; 11. detergent automatic deliverer; 12. non-return structure; 13. one-way valve; 14. control valve; 15. non-return washer; 16. circulating pipe; 17. water level sensor; 151. check part; 152. mounting part; 153. connecting column.

DETAILED DESCRIPTION

The present disclosure is described in detail below with reference to the drawings.

As shown in FIG. 1 to FIG. 4, a washing machine of the embodiment of the present disclosure is internally provided with a conventional washing machine structure and is provided with a flocculation water treatment device. The washing machine structure comprises an outer barrel 2, a clothes washing structure arranged in the outer barrel 2, and a water inlet system. The bottom and the upper part of the outer barrel are respectively connected with a casing framework through a damper and a suspension spring. The water inlet system comprises a water inlet structure provided with a water inlet valve 1, and a detergent automatic delivery device 11. The outer barrel 2 is a containing structure for containing washing water, and the clothes washing structure arranged in the outer barrel can be an inner barrel and/or an impeller. A circulating pipe 16 is arranged outside the outer barrel 2, and a circulating pump 4 is arranged in the circulating pipe 16, so that the washing water can flow between the outer barrel 2 and the circulating pipe 16 in a self-circulating manner, and the washing efficiency of the washing machine is improved.

The flocculation water treatment device in this embodiment of the present disclosure at least comprises a flocculation treatment unit. The flocculation treatment unit comprises a flocculation container 7 communicating with the outer barrel 2, and a flocculant deliverer 8 for delivering a flocculant into the flocculation container 7. Water is drained from the outer barrel 2 to the flocculation container 7 for flocculation treatment, and clean water, which reaches the standard after the flocculation treatment, reflows into the outer barrel to be used for clothes washing, so that the purpose of circulating self-cleaning and utilization of washing water and/or rinsing water is achieved.

As shown in FIG. 1 to FIG. 5, in this embodiment of the present disclosure, the washing machine is also provided with the circulating pipe 16 for driving washing water in the outer barrel 1 to perform self-circulation from bottom to top. One end of the circulating pipe 16 communicates with a self-circulating water outlet in the lower part of the outer barrel 1, and the other end of the circulating pipe 16 communicates with a water outlet of the flocculation container 7 and a self-circulating water inlet of the outer barrel 1 through a tee joint 10, and a non-return structure 12 for preventing flocculation water from reflowing into the flocculation container 7 is arranged between the tee joint 10 and the water outlet of the flocculation container 7. The circulating pipe 16 is provided with a circulating pump 4 for providing power for the self-circulating water flows, so that the water flows in the circulating pipe 16 can flow in a direction from the self-circulating water outlet of the outer barrel 2 to the tee joint 10.

In this embodiment of the present disclosure, in a washing process of the washing machine, washing water flows between the outer barrel 2 and the circulating pipe 16 in a circulating manner. After washing process is completed, the washing water flows into the flocculation container 7 for flocculation treatment, and the flocculation water, which reaches the standard after flocculation treatment, reflows into the outer barrel 2 through the non-return structure 12 and the circulating pipe 16 to be used for rinsing by the washing machine.

Through the above arrangement and method, the washing machine can have both a flocculating self-cleaning treatment function and a circulating water washing function; and besides, a flocculation water reflowing device is integrated into the circulating pipe, so that the structure of the washing machine can be more compact, and the integration degree of the washing machine is increased. In particular, through the arrangement of the non-return structure, the self-circulating water flows cannot reflow into the flocculation container, and the flocculation water treatment function and the circulating water washing function cannot interfere with each other.

Embodiment 1

Figure 2:
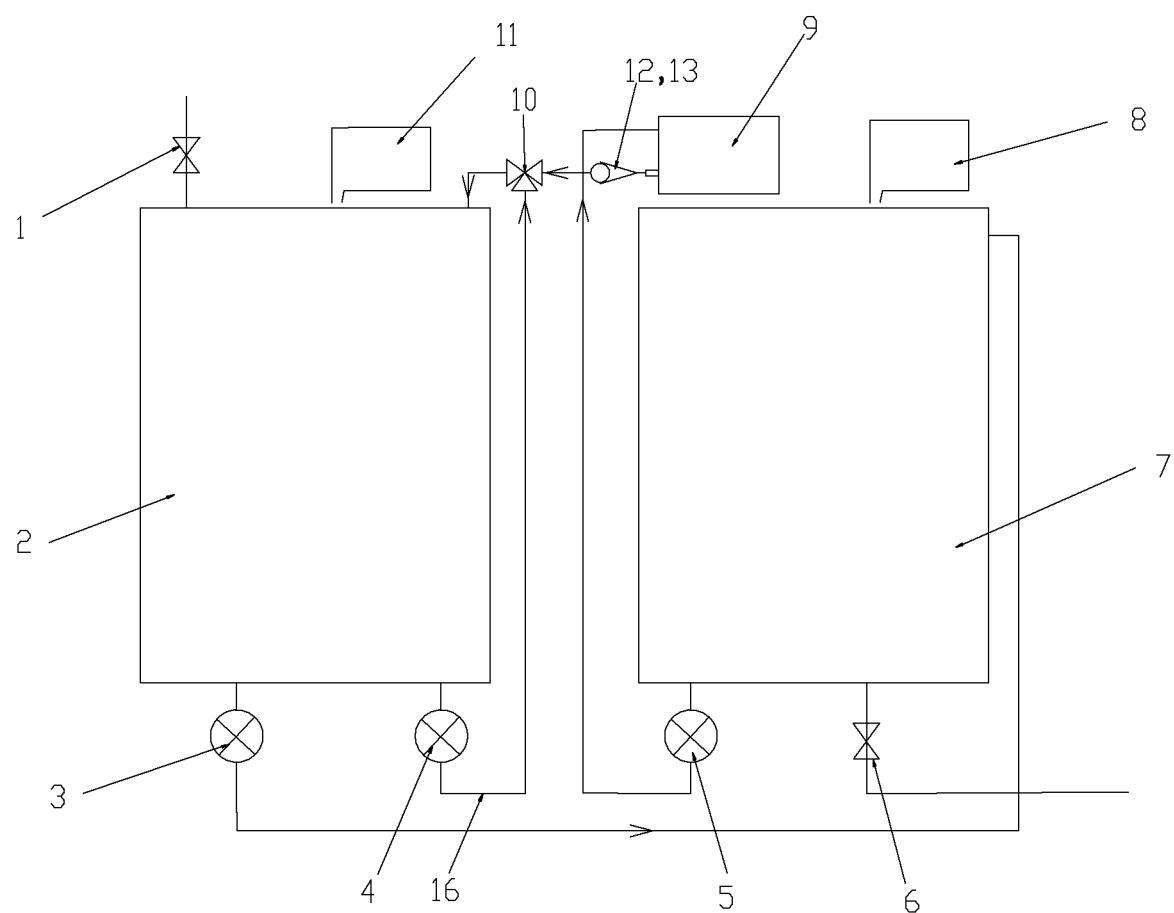
FIG. 2 is a schematic diagram of a washing machine in another embodiment of the present disclosure.
Figure 3:
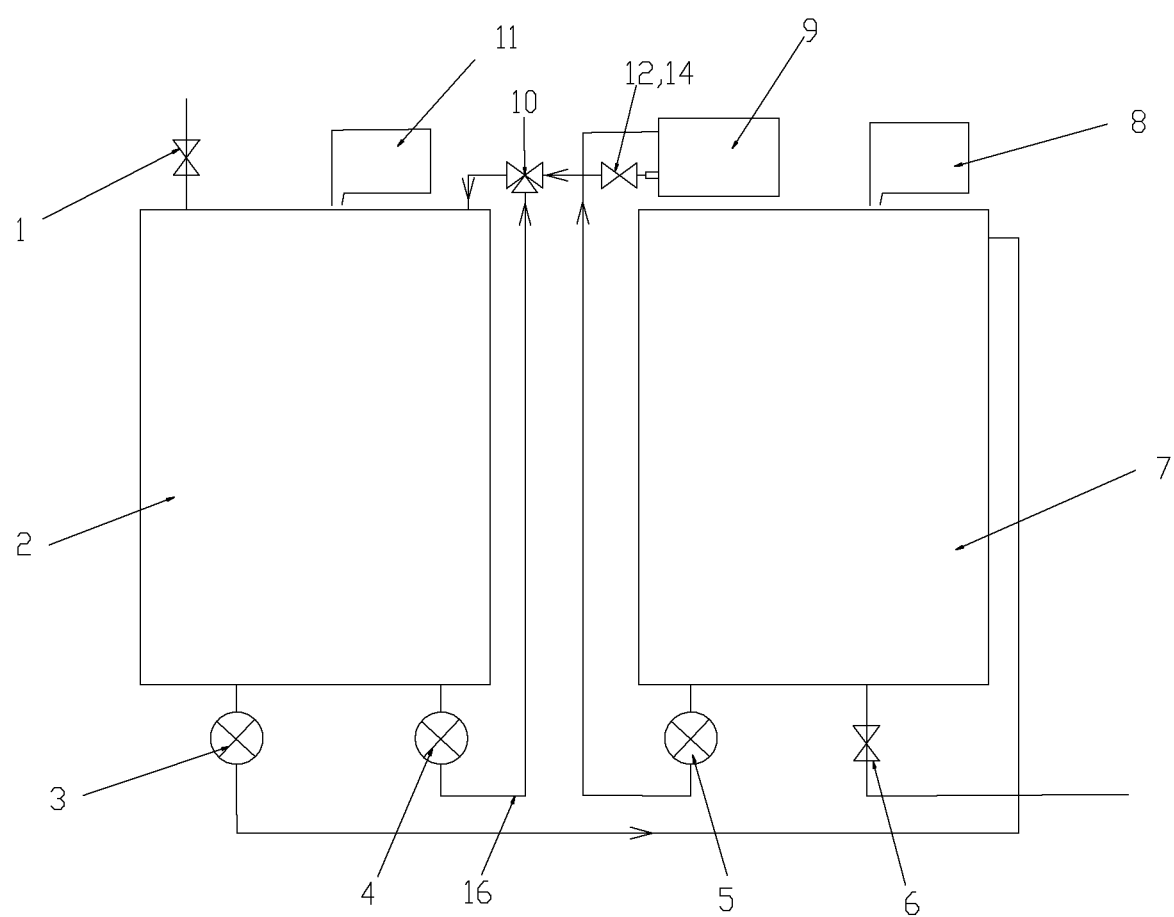
FIG. 3 is a schematic diagram of a washing machine in still another embodiment of the present disclosure.

As shown in FIG. 1 to FIG. 3, in this embodiment, the flocculation water treatment device further comprises a filtering device 9, and the filtering device 9 performs filtration treatment on the flocculation water after flocculation treatment, so that residual flocculates in the flocculation water are filtered out and separated. A water outlet of the filtering device 9 is connected with the tee joint 10, so that the clean water after filtration reflows into the outer barrel 2 and the circulating pipe 16 through the tee joint 10.

In this embodiment, the non-return structure 12 is arranged at the water outlet of the filtering device 9, so that self-circulating water flows flowing through the tee joint 10 cannot reflow into the filtering device 9, and clean water after flocculation and filtration in the filtering device 9 can flow into the outer barrel 2 and the circulating pipe 16 through the tee joint. The purpose that the flocculation self-cleaning treatment function and the circulating water washing function cannot interfere with each other is realized.

As shown in FIG. 1 to FIG. 4, in this embodiment, a self-circulating water inlet 24 and a water inlet 23 are formed in the upper part of the outer barrel 2, and a water outlet 21 and a self-circulating water outlet 22 are formed in the bottom of the outer barrel 2. And preferably, the self-circulating water inlet 24 and the water inlet 23 are of the same structure, so that the structure of the washing machine is simplified. A drain outlet 73 is formed in the bottom of the flocculation container 7, a water return opening 72 is formed in the lower part of the flocculation container 7, and a water inlet 71 is formed in the upper part of the flocculation container 7.

In this embodiment, the water outlet 22 of the outer barrel 2 communicates with the water inlet 71 of the flocculation container 7 through a conduit provided with a first water pump 3, the water return opening 72 of the flocculation container 7 communicates with the water inlet 91 of the filtering device 9 through a conduit provided with a second water pump 5, and the water outlet 92 of the filtering device 9 communicates with the self-circulating water inlet 24 of the outer barrel 2 through the tee joint 10, so that a controllable circulation loop of the washing water between the outer barrel 2 and the flocculation container 7 is formed. The drain outlet 73 of the flocculation container 7 extends to the outside of the washing machine through a conduit provided with a drain valve 6, so that sewage and flocculates which do not reach the standard after washing or flocculation treatment are drained out.

Embodiment 2

Figure 6:
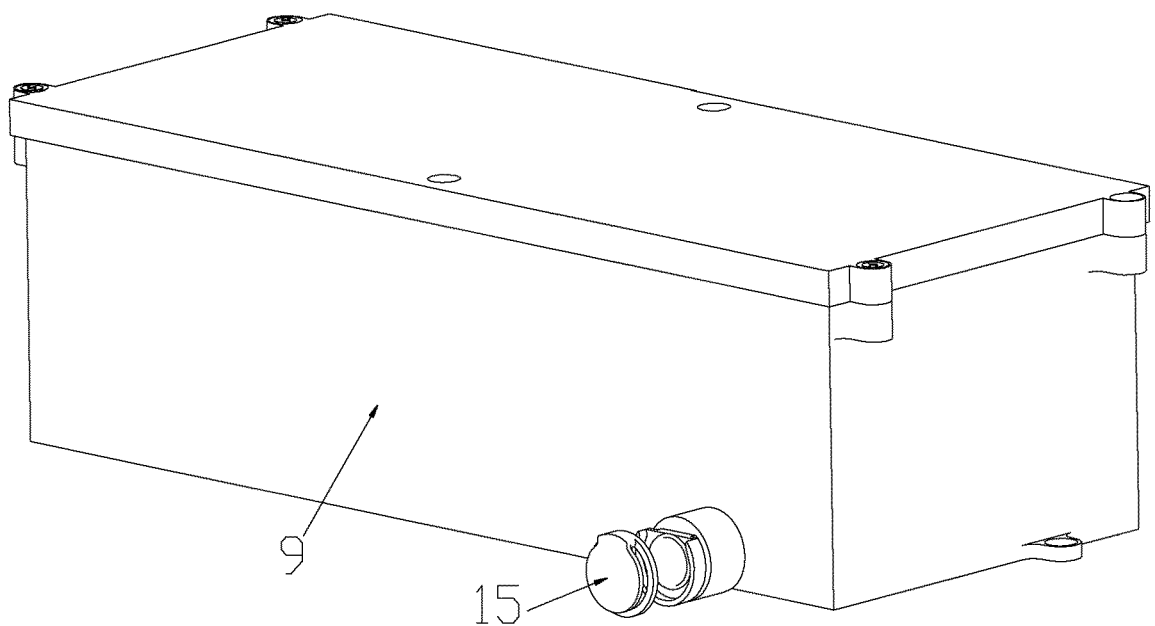
FIG. 6 is a schematic diagram of a filtering device in the embodiment of the present disclosure.
Figure 7:
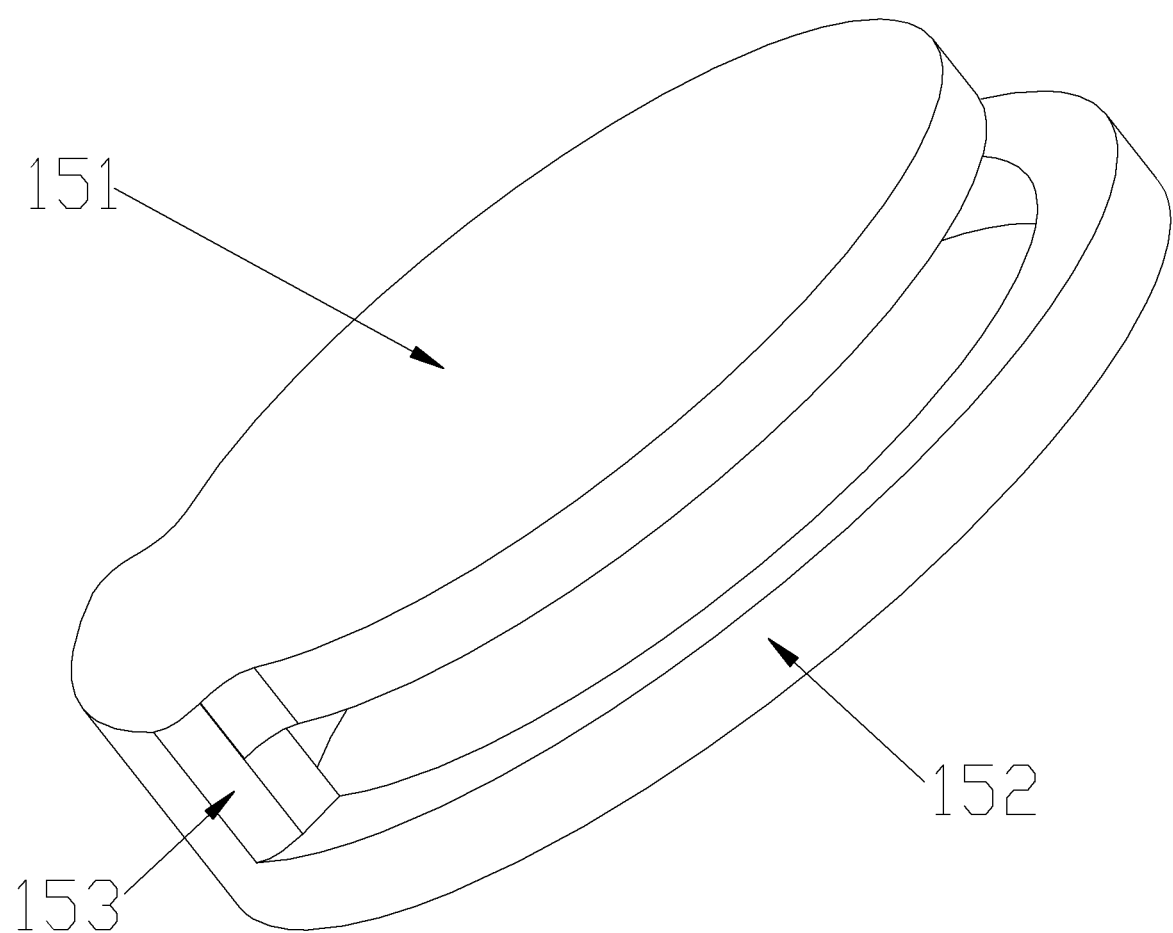
FIG. 7 is a schematic diagram of a non-return washer in the embodiment of the present disclosure.

As shown in FIG. 1, FIG. 6 and FIG. 7, in this embodiment, the non-return structure 12 is a non-return washer 15, the non-return washer 15 comprises a ring-shaped mounting part 152 which is mounted on a pipe wall of the water outlet of the filtering device 9 in a sleeving manner and a disc-shaped check part 151 covering the water outlet of the filtering device 9, and the mounting part 152 and the check part 151 are formed into one piece through a connecting column 153. The non-return washer 15 is arranged at the water outlet of the filtering device, so that the check part 151 can be pushed open by the pressure of clean water after flocculation treatment in the filtering device 9, and the clean water flows into the outer barrel and the circulating pipe through the tee joint. Besides, in the washing process of the washing machine, the water outlet is covered with the check part 151, so that water in the circulating pipe 16 can only flow into the outer barrel 2 and cannot reflow into the filtering device 9, and it is ensured that the flocculation reaction and the self-circulating washing cannot interfere with each other.

In this embodiment, the connecting column 153 is made from a flexible material which undergoes elastic deformation, the two ends of the connecting column 153 are respectively connected with the outer peripheries of the check part 151 and the mounting part 152. The mounting part 152 is arranged in a position far away from the tee joint 10 relative to the check part 151, so that the check part 151 moves towards the tee joint 10 under the action of the pressure of water which flows in the filtering device 9, and the purpose of single-direction flowing of the water flows between the filtering device 9 and the tee joint 10 is realized.

Through the arrangement of the non-return washer adopting the above structure, the water outlet is opened or closed by the check part under the action of the pressure of the water flows, so that the purpose that the water flows at the water outlet can only flow in a single direction towards the tee joint is realized.

In this embodiment, as shown in FIG. 2, the non-return structure 12 is a one-way valve 13 for controlling the direction of the water flows at the water outlet of the filtering device 9. Water flows in a single direction from the water outlet of the filtering device 9 to the tee joint 10 under the action of the one-way valve 13. Through the arrangement of the one-way valve between the tee joint 10 and the water outlet of the filtering device 9, a technical effect as same as using the non-return washer 15 is achieved, so that the flocculation water treatment function and the circulating water washing function cannot interfere with each other.

Embodiment 3

As shown in FIG. 3, in this embodiment, the non-return structure 12 is a control valve 14 for controlling the on and off of water flows between the water outlet of the filtering device 9 and the tee joint 10, and the control valve 14 opens or closes the water outlet in a controllable manner, so that control on the reflow flocculation water is realized.

In this embodiment, the specific working mode of the washing machine is as follows:

1) in a washing process, the control valve is closed, so that the self-circulating water outlet and the self-circulating water inlet of the outer barrel communicate with each other through the circulating pipe, and the flocculation container is disconnected from the circulating pipe;

2) in a process that flocculation treatment stops, the control valve is opened, so that the self-circulating water outlet and the self-circulating water inlet of the outer barrel communicate with each other through the circulating pipe, the flocculation container communicates with the circulating pipe, and flocculation water which reaches the standard after flocculation treatment reflows into the outer barrel; and 3) if flocculation water after rinsing or flocculation treatment by the washing machine does not reach the standard, all of the washing water in the outer barrel and the flocculation water in the flocculation container is drained to the outside of the washing machine.

Through the above arrangement and method, control on the direction of water flows in the tee joint can also be realized, and the purpose of integrating the flocculation reaction and the self-circulating washing into the washing machine is realized.

Embodiment 4

Figure 4:
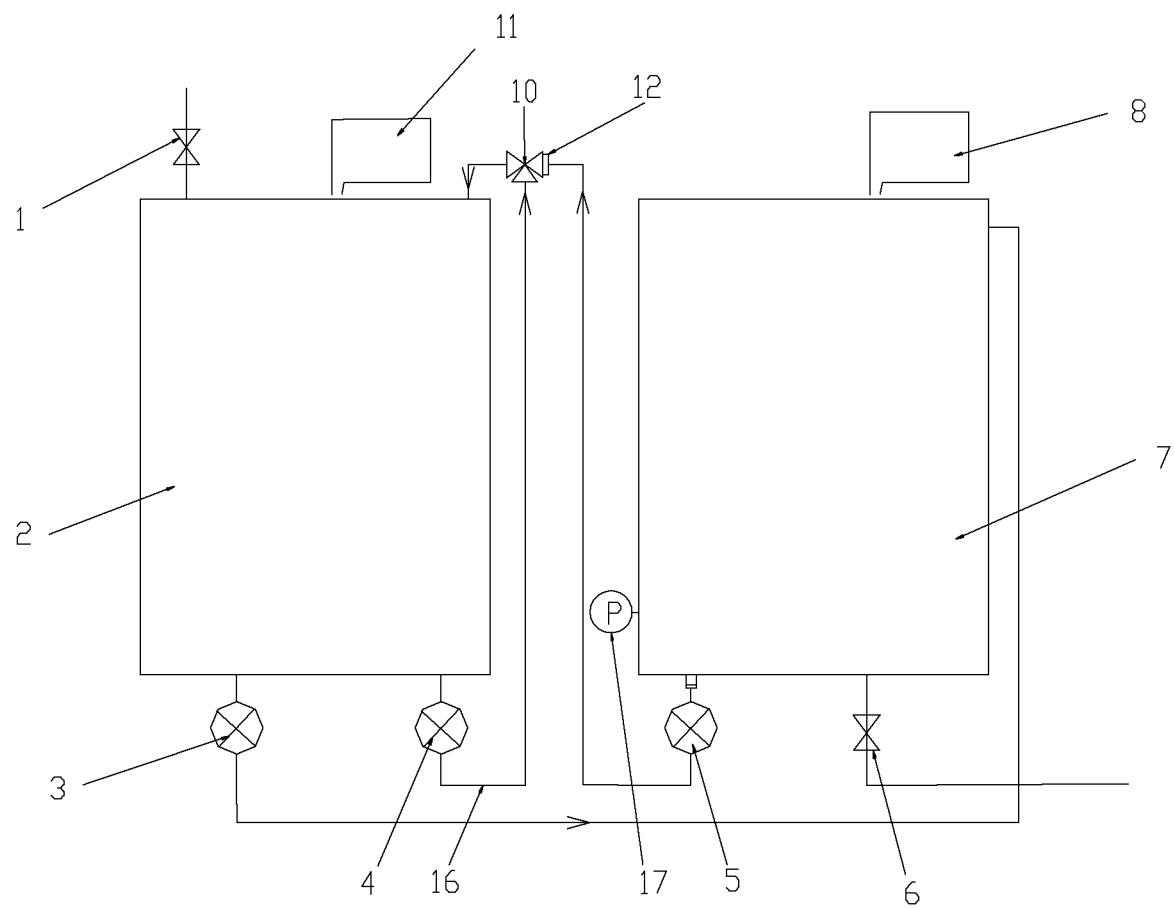
FIG. 4 is a schematic diagram of a washing machine in yet another embodiment of the present disclosure.
Figure 5:
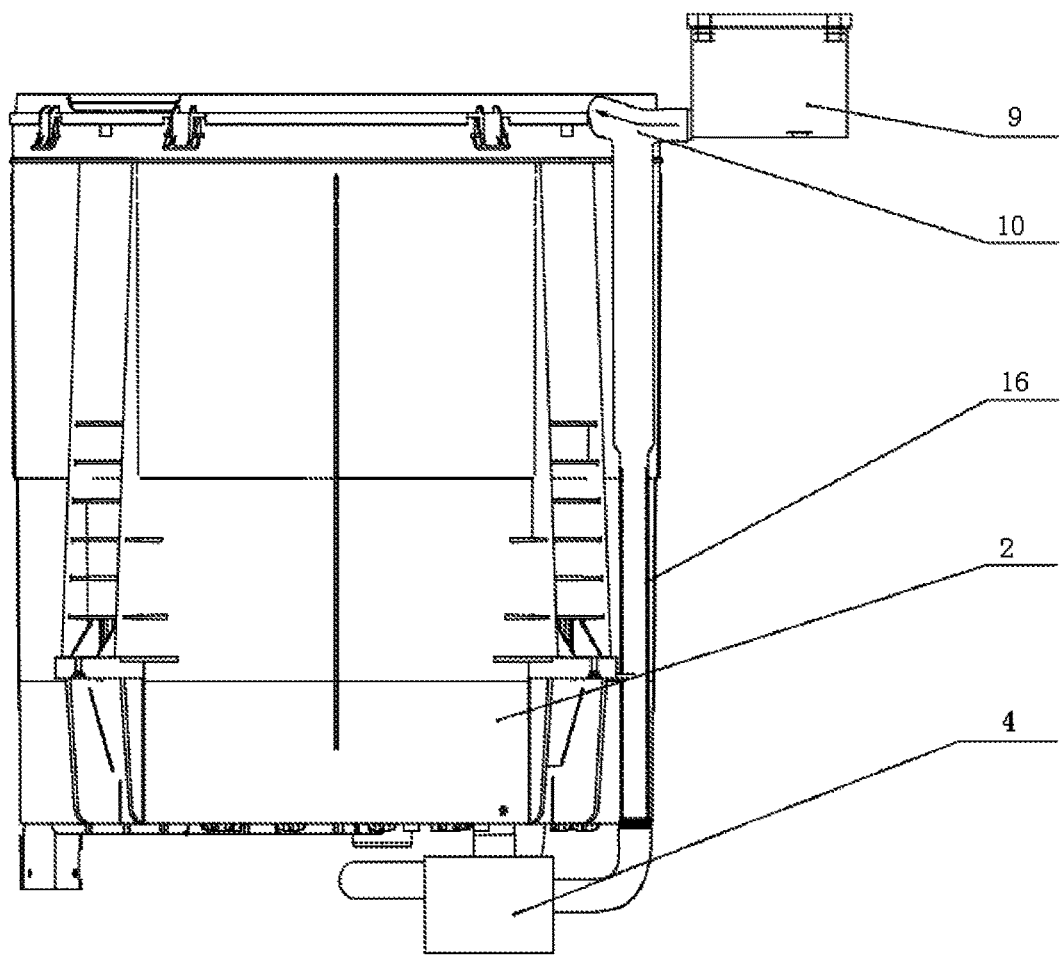
FIG. 5 is a connection schematic diagram of a circulating pipe of the washing machine in the embodiment of the present disclosure.

As shown in FIG. 4, in this embodiment, flocculates can also be separated from the clean water without using the filtering device. For example, a water level sensor 17 is arranged in the flocculation container 7, so that the water level in the flocculation container 7 always maintains at a certain height, flocculates floating at the water level of the flocculation container are always retained in the flocculation container, and the purpose of removing the flocculates in the flocculation water is also realized.

As shown in FIG. 4, in this embodiment, the water return opening of the flocculation container 7 is directly connected with the tee joint 10, so that clean water after flocculation treatment directly reflows into the outer barrel 2 through the tee joint 10 to be used for rinsing by the washing machine. In this embodiment, the non-return structure 12 is arranged on a conduit between the water return opening of the flocculation container 7 and the tee joint 10, so that the condition that the water at the circulating pipe reflows to the flocculation container is avoided. Preferably, the non-return structure 12 is arranged on a conduit between the tee joint 10 and the second water pump 5. And further preferably, the non-return structure 12 is arranged at an opening where the tee joint 10 and the second water pump 5 are connected, so that the condition that the circulating water flows into the conduit between the tee joint 10 and the second water pump 5 is avoided.

Through the above arrangement, the circulating water washing function can also be integrated into a flocculation self-cleaning washing machine without a filtering device, so that the applicability of the method and the device disclosed by the present disclosure is improved, and the purpose of improving product diversity is achieved.

What described above are only preferred embodiments of the present disclosure, it should be noted that, without departing from the principle of the present disclosure, various changes and modifications made by those skilled in the art shall all be covered within the scope of the technical solution of the present disclosure.

The invention claimed is:

1. A self-circulating flocculation washing machine, comprising an outer barrel, a clothes washing structure arranged in the outer barrel and a flocculation water treatment device arranged outside the outer barrel, the flocculation water treatment device comprising a flocculation container for performing flocculation treatment on water drained from the outer barrel,
wherein, the self-circulating flocculation washing machine is also provided with a circulating pipe for driving washing water in the outer barrel to perform self-circulation from bottom to top; a first end of the circulating pipe communicates with a water return opening of the flocculation container and a self-circulating water inlet in an upper part of the outer barrel through a tee joint, and a non-return structure for preventing flocculation water from reflowing is arranged between the tee joint and the water return opening of the flocculation container,
wherein the non-return structure is a non-return washer, the non-return washer comprises a mounting part which is ring-shaped and mounted on a pipe wall of the water outlet of the filtering device in a sleeving manner and a check part which is disc-shaped and covers the water outlet of the filtering device, the mounting part and the check part are connected through a connecting column, and the connecting column is made from a flexible material which undergoes elastic deformation.

2. The self-circulating flocculation washing machine according to claim 1, wherein the flocculation water treatment device further comprises a filtering device for filtering water after flocculation treatment to separate flocculates; and
a water outlet of the filtering device is connected to the tee joint, and the non-return structure is arranged at the water outlet of the filtering device.

3. The self-circulating flocculation washing machine according to claim 2, wherein a second end of the circulating pipe is connected with a self-circulating water outlet in a bottom of the outer barrel, the first end of the circulating pipe communicates with the self-circulating water inlet in the upper part of the outer barrel and the water outlet of the filtering device through the tee joint, and
the circulating pipe is provided with a circulating pump for providing power for self-circulating water flow, the water flow in the circulating pipe flows from the self-circulating water outlet of the outer barrel to the tee joint.

4. A control method for the washing machine according to claim 2, comprising,
in a washing process of the washing machine, washing water flowing between the outer barrel and the circulating pipe in a circulating manner under an action of the non-return structure;
after the washing process is completed, performing a flocculation treatment on the washing water, and
flocculation water which reaches a standard after the flocculation treatment reflowing into the outer barrel and/or the circulating pipe for rinsing by the washing machine.

5. The self-circulating flocculation washing machine according to claim 1, wherein a second end of the circulating pipe is connected with a self-circulating water outlet in a bottom of the outer barrel, the first end of the circulating pipe communicates with the self-circulating water inlet in the upper part of the outer barrel and the water outlet of the filtering device through the tee joint, and
the circulating pipe is provided with a circulating pump for providing power for self-circulating water flow, the water flow in the circulating pipe flows from the self-circulating water outlet of the outer barrel to the tee joint.

6. The self-circulating flocculation washing machine according to claim 5, wherein a water outlet is formed in the bottom of the outer barrel, and the water outlet communicates with a water inlet of the flocculation container through a conduit provided with a first water pump;
the water return opening and a first drain opening are formed in a bottom of the flocculation container, and the water return opening communicates with a water inlet of the filtering device through a conduit provided with a second water pump; and the first drain opening of the flocculation container extends to a second drain opening outside the self-circulating flocculation washing machine through a conduit provided with a drain valve.

7. A control method for the washing machine according to claim 1, comprising,
in a washing process of the washing machine, washing water flowing between the outer barrel and the circulating pipe in a circulating manner under an action of the non-return structure;
after the washing process is completed, performing a flocculation treatment on the washing water, and
flocculation water which reaches a standard after the flocculation treatment reflowing into the outer barrel and/or the circulating pipe for rinsing by the washing machine.

8. The control method according to claim 7, wherein in the washing process, the self-circulating water outlet and the self-circulating water inlet of the outer barrel communicate with each other through the circulating pipe, and the flocculation container is disconnected from the circulating pipe under the action of the non-return structure; and
after the flocculation treatment is completed, the self-circulating water outlet and the self-circulating water inlet of the outer barrel communicate with each other through the circulating pipe, and the flocculation container communicates with the circulating pipe under the action of the non-return structure, the flocculation water which reaches the standard after flocculation treatment reflows into the outer barrel.

9. The control method according to claim 8, wherein the flocculation water after flocculation treatment is filtered, residual flocculates in the flocculation water are filtered out, and clean water obtained through filtering reflows into the outer barrel and/or the circulating pipe.

10. The control method according to claim 7, wherein the flocculation water after flocculation treatment is filtered, residual flocculates in the flocculation water are filtered out, and clean water obtained through filtering reflows into the outer barrel and/or the circulating pipe.

11. The control method according to claim 10, wherein water flows in a single direction from the water outlet of the filtering device to the outer barrel and the circulating pipe under the action of the non-return structure.

* * * * *